July 31, 1928.

G. W. RIDDLE

HOSE CLAMP

Filed Sept. 8, 1927

1,678,915

Inventor

George W. Riddle

By Clarence A. O'Brien
Attorney

Patented July 31, 1928.

1,678,915

UNITED STATES PATENT OFFICE.

GEORGE W. RIDDLE, OF CHILLICOTHE, MISSOURI.

HOSE CLAMP.

Application filed September 8, 1927. Serial No. 218,240.

This invention relates to new and useful improvements in flexible hose clamps and aims to provide a highly novel simple and efficient clamp whereby flexible hoses may be secured to pipes in watertight manner, and wherein there will be but little liability of the clamp becoming loose and permitting the water to escape through the connection.

The invention further aims to provide a hose clamp wherein the same may be easily tightened to a predetermined degree and wherein the entire clamp may be quickly arranged upon the hose and as quickly removed therefrom when necessary.

Figure 1:
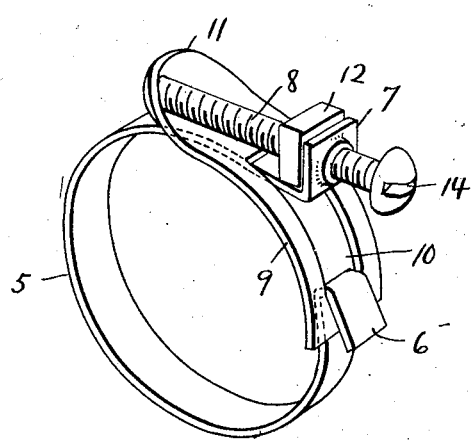
Figure 2:
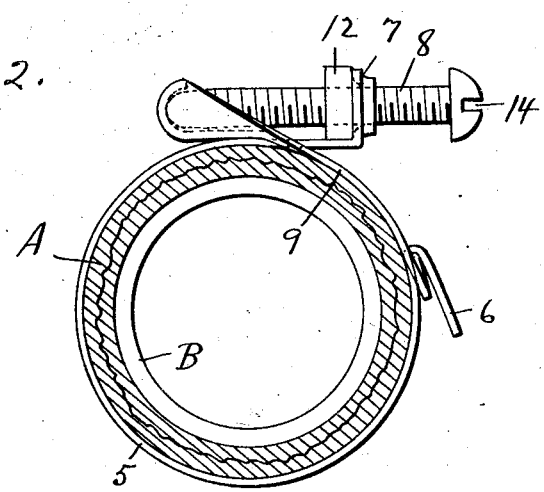

In the drawings wherein like reference characters indicate corresponding parts in both of the views, Figure 1 is a perspective of my hose clamp per se, and, Figure 2 is a section through a flexible hose and pipe wherein the hose is secured to the pipe by reason of the present invention.

Now having particular reference to the drawing, 5 designates a metallic band bent over in an outward direction upon itself at one end to provide a tongue 6 while the opposite end of the band is bent directly upwardly to provide an ear 7 through which is an opening to permit a relatively elongated threaded pin 8 to be passed therethrough. The invention further consists of a curved metallic plate 9 of predetermined length and width having adjacent one end a slot 10 through which the tongue 6 and ear 7 of the band 5 project. The tongue 6 is hooked over the plate 9 at the lower edge of the slot as clearly indicated in Figure 1. The end of this plate 9 inwardly of the band ear 7 is so formed as to provide a tangentially extending pocket 11 open at the inner end of the threaded pin 8 and within which said end of said pin is to fit as disclosed. Threaded upon this pin 8 directly in back of the ear 7 is a nut 12 while the outer end of the pin provided with a head 13 having a screw driver kerf 14.

The normal tendency of the band 5 is to expand and obviously when the pin 8 is threaded in an outward direction the size of the band will be sufficient to enable the same to be disposed over a flexible hose A that is arranged upon a rigid pipe B. The pin is then turned inwardly for causing the separation of the plate pocket 9 and the band ear 7 which will obviously contract the band to firmly engage the same upon the pipe.

It will thus be seen that I have provided a highly novel simple and extremely efficient coupling that is well adapted for all of the purposes heretofore designated, and even though I have herein shown and described the invention as consisting of certain detailed structural elements, it is nevertheless to be understood that some changes may be made therein without affecting the spirit and scope of the appended claim.

Having thus described my invention, what I claim as new is:—

In a hose coupling of the character described, a metallic band, the ends of which are normally separated, a curved plate for engagement at the ends of the band, a detachable connection between one end of the plate and one end of the band, a sliding connection between the opposite end of the band and the plate adjacent its opposite end, a sliding connection between the opposite end of the band and the plate adjacent its opposite end and means between said ends of the band and plate whereby the ends may be forcibly separated to cause the compression of said band, said means consisting of a tangentially extending pin threaded to the band and a pocket at the adjacent end of said plate within which the end of said pin engages.

In testimony whereof I affix my signature.

GEORGE W. RIDDLE.